March 26, 1946.    B. N. ASHTON ET AL    2,397,117
UNLOADER VALVE
Filed Jan. 20, 1943
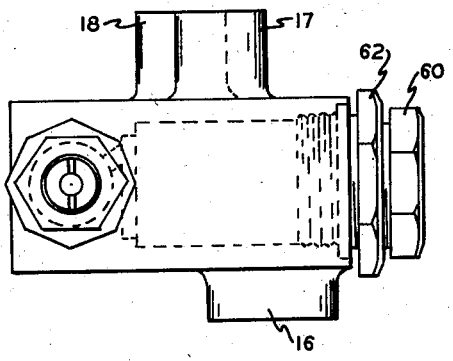
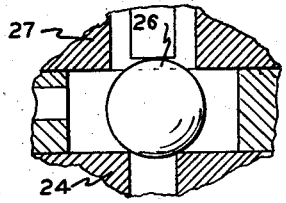
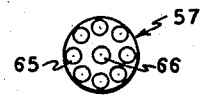
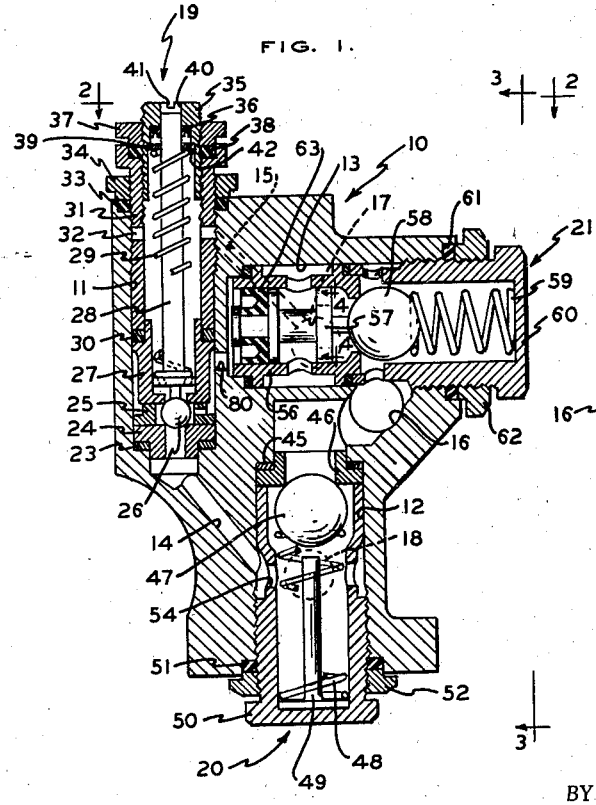
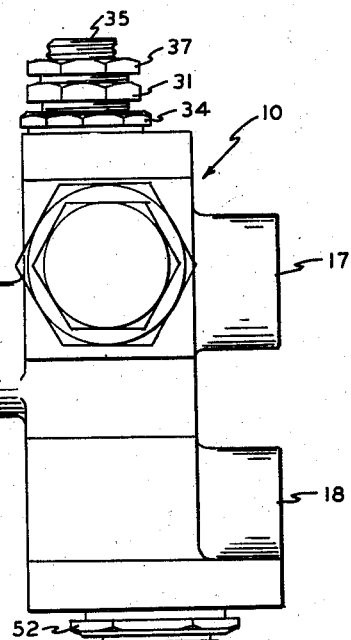
INVENTORS
BENJAMIN N. ASHTON
NELSON G. KLING
BY Howard T. Jeanhon
ATTORNEY Patented Mar. 26, 1946

2,397,117

UNITED STATES PATENT OFFICE 2,397,117

UNLOADER VALVE

Benjamin N. Ashton, Kingston, and Nelson G. Kling, Great Neck, N. Y., assignors to Electrol Incorporated, Kingston, N. Y., a corporation of Delaware Application January 20, 1943, Serial No. 472,964

3 Claims. (Cl. 137—153)

This invention relates to a pressure regulating valve for a high pressure hydraulic system, and more particularly to an unloading valve for maintaining in the system a working pressure supplied from a constant pressure supply.

In the operation of hydraulic systems especially for aircraft use, the major consideration is weight and efficient operation of the units to preclude leakage due to the high pressures used. Another consideration is to insure the loading of the system with a fluid medium to a predetermined pressure under all temperature conditions, and after loading the assurance that the pressure will be maintained regardless of the variation in temperature from a subnormal to an extremely high condition.

It is, therefore, an object of the present invention to provide a regulating valve in the pressure supply line of a hydraulic system, which permits the loading of fluid to a maximum working pressure and the holding of that pressure while the system is in a static condition, and after the operation of the system the reloading of the system with fluid to maintain the range of working pressure.

A further object of the present invention is to provide a balanced poppet valve control to insure the by-passing of a fluid pressure supply when the pressure in the system supply port reaches a predetermined maximum value, and the same poppet valve to control the reloading of the fluid pressure to the system port when the pressure therein reaches a predetermined minimum value.

A further object is to provide a regulating valve of the poppet type in the pressure supply line of a hydraulic system which permits the loading of fluid under low temperatures, and the holding of that predetermined pressure at a low temperature.

A still further object is to provide a regulating valve of the poppet type in the pressure supply line of a hydraulic system which maintains that predetermined pressure and prevents any leakage under extremely high temperatures.

A still further object of the present invention is to provide a regulating valve mechanism which is compact, light in weight, simple in construction, efficient in use, and inexpensive to manufacture.

Other objects and characteristic features of the invention will appear from the following detailed description of one embodiment thereof, taken in connection with the accompanying drawing wherein identical reference numerals are applied to the same parts in the several figures, and in which Fig. 1 is a cross sectional view of the unloader valve, illustrating all the structural and operating elements, Fig. 2 is a top plan view of Fig. 1, Fig. 3 is a side elevational view of Fig. 1, Fig. 4 is a view taken on line 4—4 of Fig. 1, and Fig. 5 is an enlarged detail view of the double acting system ball poppet valve and both valve seats.

In the preferred embodiment illustrated in Fig. 1, there is provided a casting 10 which is provided with three large borings 11, 12 and 13 and two small interconnecting bores 14 and 15. There are also provided three ports, a pressure supply port 16, a return port 17 and a system port 18. Mounted in the bore 11 of the casting 10 is the system poppet valve assembly 19, mounted in the bore 12 of the casting 10 is the system pressure check valve assembly 20, and mounted in the bore 13 of the casting 10 is the supply pressure by-passing or control valve assembly 21.

The system poppet valve assembly 19 is comprised of a washer 23, a ball valve seat 24, a spacer 25, a ball 26, a ball seat 27, a spring actuated push rod 28 with a spring 29, a seal 30, a retaining shell 31 with perforations 32, a seal 33, a seal lock 34, a cap nut 35 with a U cup seal 36, and a lock nut 37 with seal 38; also, a spring retainer 39.

The cap nut 35 is formed with a center bore 40 to permit the push rod 28 to move up or down in, and in addition has a screw cut head 41 and threaded external periphery to allow adjustments. The cap nut 35 also has an internal shoulder 42 which acts as a stop for the spring retainer 39. It is apparent that the compression of spring 29 may be varied by the adjustment of the cap nut 35, and, therefore, the resistance of the push rod 28 to an upward movement of the ball 26 may be predetermined. The retainer shell 31 is threadably secured in the bore 11 so that the perforations 32 will align with the connecting bore 15, and at the same time bear on the seal 30 to retain the seats 27 and 24 in their proper relationship. The seal lock 34 and lock nut 37 are threadably secured to give a tight sealing action on the seals 33 and 38. The U cup 36 permits movements of the push rod 28 without leakage.

The check valve assembly 20 is comprised of a washer 45, a ball valve seat 46, a ball 47, a spring 48, a ball stop 49, a retainer plug 50, a seal 51, and a seal lock 52. The retainer plug 50 is threadably secured in the bore 12 and bears against the ball seat 46 to retain it in position. The retainer shell has a plurality of perforations 54 to permit the ball check valve to be connected with the interconnecting bore 14. The ball check 47 is normally retained in a seated position by the spring 48 as illustrated in Fig. 1, but in operation the fluid supply from the port 16 will force the ball 47 off the seat 46, passing on to the system port 18. The ball 47 will be moved off its seat enough to pass the fluid freely to the system port, but is prevented from moving more than desired by the stop 49.

The control valve assembly 21 is comprised of a piston cylinder and ball seat member 56, a piston 57, a ball 58, a spring 59, a retainer plug 60, a seal 61, and a seal lock 62. The piston 57 has a U cup 63 to insure the sealing of the pressure fluid at all times. The ball seat member 56 is retained in the bore 13 by the threadably secured retainer plug 60. The piston 57 is slidably mounted in the cylinder seat 56 and serves but one function; that is, to use the back pressure from the system to move the piston and unseat the poppet ball from its seat, this being performed by the contact of the piston head against the ball 58. The spring 59 is seated in the retainer plug 60 and bears against the poppet ball 58 to retain it on the seat 56.

Referring to Fig. 4, the piston 57 has a perforated head 65 to permit the fluid to be freely by-passed, and a projecting point 66 which normally contacts the ball 58.

Referring to Fig. 5, the ball 26 is movably positioned between two ball seats 27 and 24 with a very small degree of movement. The lower seat 24 controls the flow of pressure fluid and the upper seat 27 controls the flow of exhaust fluid to a return. The lower seat or pressure supply side is slightly smaller than the upper seat or exhaust side; therefore, when the pressure is great enough to overcome the force of the spring bearing on this ball 26 it will lift the ball from the one seat 24 and seat it against the upper seat 27. The ball will be maintained on the upper seat by the pressure differential between the pressure side of the seat 27 and the return or negative pressure side. The action of the ball may be followed by reference to the Fig. 5 in which fluid pressure is PSI, spring pressure is P and the area of the seat will be A; thus, the formula of operation will be $$PSI = \frac{P}{A}$$

Assuming that the lower seat $A=1$ and in the upper seat $A=2$, also that a two pound spring is used for P, it is apparent that slightly more than 2 PSI would be required to lift the poppet from the lower seat. After the ball has been lifted from the lower seat the 2 PSI will have twice the effective area to hold the ball against the upper seat. As the system pressure drops the pressure of the two-pound spring resets the poppet on the lower seat, when the pressure becomes 1 PSI.

As the system pressure is loaded to a maximum of slightly more than 2 PSI the poppet will be lifted from the lower seat 24 and the pressure fluid passes on to the plunger 57 and moves it to the right, thus opening the poppet valve 58 and allowing the supply pressure fluid to be by-passed to a return port 17.

In addition to the reseating of ball poppet 26, when the system pressure drops there is the reseating of the poppet ball 58 by the spring 59 which at the same time forces the piston 57 to the left and the exhausting of the fluid that lies behind this piston. Since the poppet ball 26 is at that time seated on the lower seat, the exhaust fluid will pass through the upper seat 27 and on through the perforations 32 and out the bore 15 to the return port 17.

The design of this valve structure is dependent upon the system pressure, and the control of the particular pressures for loading and unloading are dependent upon refinements in the novel design of this structure.

Assuming that the maximum system pressure is set for 1,000 lbs. and a differential of 120 lbs. is desired so that the valve will have a minimum or loading value of 880 lbs., and assuming that the valve shall permit adjustment so that the minimum pressure may be dropped or the maximum pressure may be increased, this adjustment will necessarily vary the differential pressures for loading and unloading, but the advantages of this particular design are such that the desired differential pressure is set at a predetermined low pressure, and increases slightly as the settings are stepped up to a maximum loading point. In the above instance, if the maximum pressure setting is adjusted from 1,000 lbs. to 1,200 lbs., the differential pressure will change from 120 lbs. to 150 lbs.

With a known system pressure in the port 18, the area of the ball valve seat 24 may be determined; thus a known pressure on the ball may be established. To counteract this force a desired spring force is designed for the spring 29 with the retainer 35 set at a given point. This design is to assure the ball 26 being lifted from the seat 24 against the retaining force of the spring 29, by the maximum system back pressure. To assure the desired differential in loading and unloading pressure, after the maximum or unloading pressure is established and the lower seat 24 is determined, the upper seat may be designed to give the desired differential; for instance, in this case, with a setting of 1,000 lbs. and a differential of 120 lbs., the upper seat 27 will be $\frac{1}{12}$ larger in area than the lower seat 24. Referring to Fig. 1, another refinement in the design may be explained. Whenever any back pressure is created through the bore 15, such as the surge of supply pressure from the port 16 when the supply is by-passed to the return port 17, it will in turn act on the rod 28. At the particular stage where this occurs, the ball poppet 26 is held on the upper seat 27 against the force of the spring 29. Therefore, the back pressure through the bore 15 will tend to act upon the ball 26 to assist the spring to lift the ball 26 from the seat 27. This condition is overcome by designing the rod 28 to be the same cross sectional area as the area of the seat 27, and by inserting the U-cup seal about the upper end of the rod 28. The back pressure force is thus equalized in two directions; the force upward on the rod 28 will be subtracted from the downward force of the spring 29, while the same degree of force will be added to that acting on the ball 26 to lift it from its seat 27, so that the downward force on the ball 26 remains the same.

With the foregoing theory of operation explained, a cycle of operation may be briefly explained as follows: A supply fluid line 16 capable of boosting the system operating pressure to a predetermined value is connected to the port 16.

The pressure fluid will lift the ball 47 and supply the system through the port 18. When the system pressure reaches a maximum value, the back pressure will pass through the bore 14 to lift the ball 26 against the force of the spring 29. As already explained, the ball 26 will be transferred from the seat 24 to the seat 27 and held there by this maximum pressure. With the ball 26 seated on the upper seat 27, the back pressure from the system will pass through the bore 14, the seat 24, around the exterior of seat 27 through a port 30 to the U-cup face of the piston 57, forcing it to the right against the ball 58, which is retained by a spring 59. When the ball 58 is lifted from its seat, the supply pressure from the port 16 will be by-passed directly to a return port 17, thereby reducing the pressure acting on ball 47, and, therefore, the greater back pressure in the system will seat the ball 47, acting as a check valve to retain the system pressure. In this manner the system reaches a maximum operating pressure and may be held at that pressure while in a static condition. When the system through operation drops to a predetermined minimum pressure, the valve must reset to permit reloading the system to its maximum value. This occurs as follows: The dropping of pressure in the system reduces the PSI on the ball 26 and the holding pressure on the ball 47. The spring 29 will return the ball 26 to the lower seat 24. When the ball 26 is seated on the lower seat the pressure fluid holding the piston 57 will be exhausted through the upper seat 27 and on to the return port 17; in addition to the exhausting of this fluid, the ball 58 will be returned to its seat by the spring 59, and the supply pressure will lift the ball 47 from its seat, thus supplying fluid to the system to boost the operating pressure. Thus a complete cycle of operation occurs. Also in operation it is desirable to adjust the valve to maintain a particular range of pressure which in this instance may be set as low as 650 lbs., or it may be set as high as 1,450 lbs., but the differential of pressures will remain between 120 lbs. and approximately 200 lbs., depending on the setting. This adjustment for a given valve with a predetermined spring value is dependent upon the position of the cap nut 35. When screwed all the way down, a maximum pressure may be attained; when unscrewed to its highest point, a minimum pressure may be attained.

The embodiment of the invention herein disclosed is merely illustrative and may be modified and departed from in many ways without departing from the spirit and scope of the invention, as pointed out in and limited solely by the appended claims.

What is claimed is:

1. A fluid control valve comprising a valve casing having a bore therein, a first annular valve seat member in one end of said bore having a centrally located port therein, a second annular valve seat member in said bore having a centrally located port of larger diameter than the port in said first valve seat member, a ball between said valve seat members and engageable therewith alternately to close the ports therein, annular spacer means interposed between said valve seat members having an opening for receiving said ball loosely and a port extending outwardly therethrough from said opening, means in said bore for retaining said valve seat and spacer members in fixed relationship to said casing, spring means normally urging said ball against said first valve seat member, and separate passages in said casing communicating with each of said ports.

2. A fluid control valve comprising a valve casing having a bore therein, a first annular valve seat member in one end of said bore having a centrally located port therein, a second annular valve seat member in said bore having a centrally located port of larger diameter than the port in said first valve seat member, a ball between said valve seat members and engageable therewith alternately to close the ports therein, annular spacer means interposed between said valve seat members having an opening for receiving said ball loosely and a port extending outwardly therethrough from said opening, means in said bore for retaining said valve seat and spacer members in fixed relationship to said casing, a plunger extending axially of the bore and engaging said ball, means urging said plunger against said ball to seat the latter against the first-mentioned valve seat member, sealing means interposed between said plunger and said casing for preventing escape of fluid from said casing around said plunger, and separate passages in said casing communicating with each of said ports.

3. A fluid control valve comprising a casing having a bore therein, a pair of spaced apart valve seat members therein having ports of different areas, a valve member interposed between said seat members and movable to engage said seat members selectively to close the ports therein, a plunger extending axially of said bore having a body portion with cross-sectional area equal to the area of the larger port, and a reduced end portion projecting through said larger port into engagement with said valve member, one end of said body portion being exposed externally of said casing, sealing means between said one end and said casing receiving said one end slidably, a spring engaging said plunger to urge said valve member into engagement with the valve seat member having the smaller port, and three separate passages in said casing communicating with said bore between and on opposite sides of said valve seat members.

BENJAMIN N. ASHTON.
NELSON G. KLING.